Figure 1:
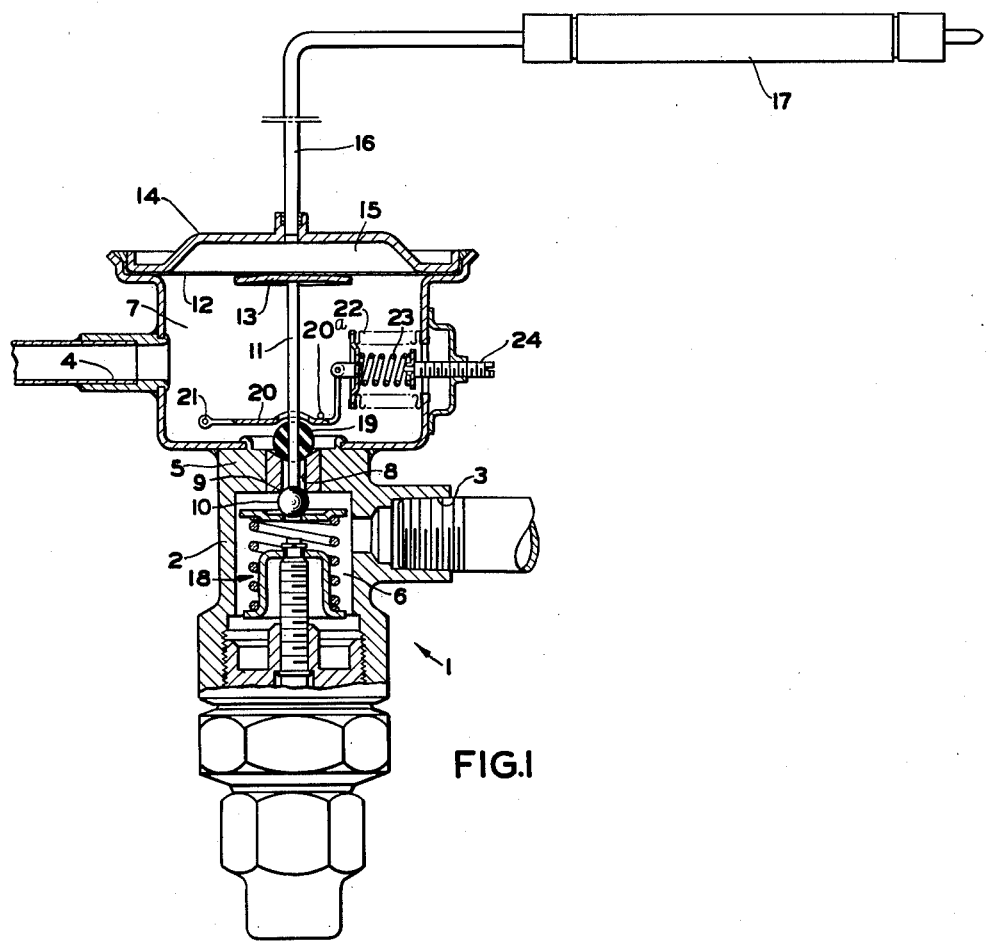

April 29, 1952 F. Y. CARTER 2,594,393
PRESSURE LIMITING MEANS FOR LIQUID CHARGED
REFRIGERATION EXPANSION VALVES
Filed Nov. 9, 1948 3 Sheets-Sheet 1

INVENTOR.
Franklyn Y. Carter
BY
Andrew K. Fowler
his ATTORNEY

April 29, 1952 F. Y. CARTER 2,594,393
PRESSURE LIMITING MEANS FOR LIQUID CHARGED
REFRIGERATION EXPANSION VALVES
Filed Nov. 9, 1948 3 Sheets-Sheet 2

INVENTOR.
Franklyn Y. Carter
BY
Andrew K. Foulds
his ATTORNEY

April 29, 1952     F. Y. CARTER     2,594,393
PRESSURE LIMITING MEANS FOR LIQUID CHARGED
REFRIGERATION EXPANSION VALVES
Filed Nov. 9, 1948     3 Sheets-Sheet 3
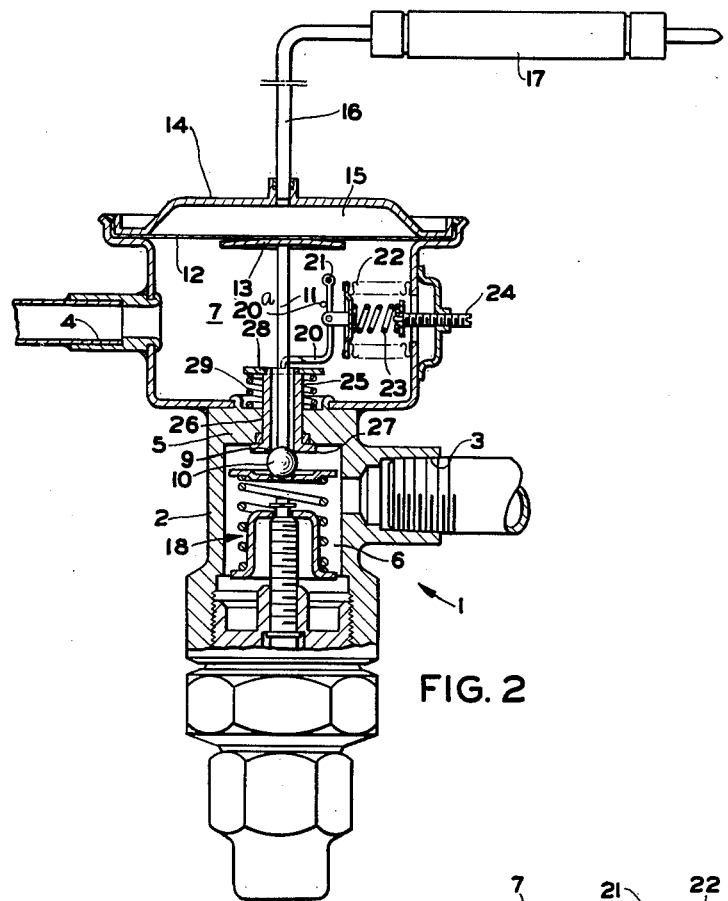
FIG. 2
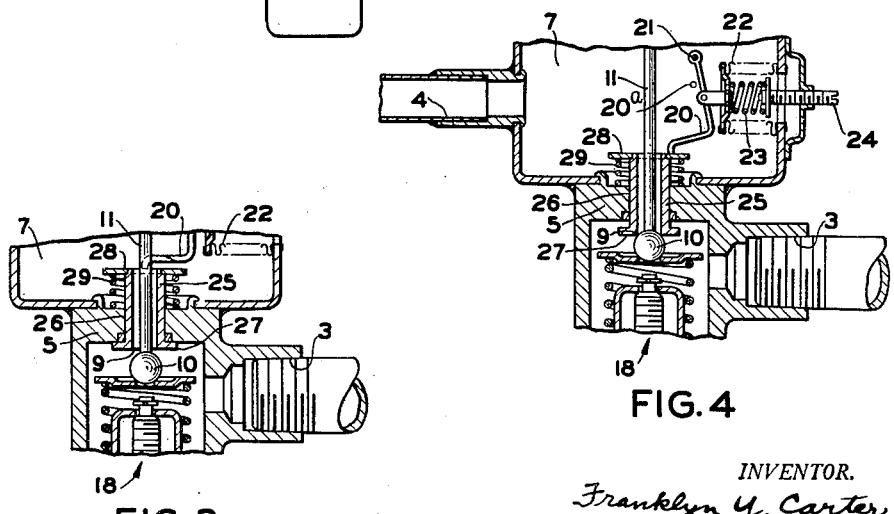
FIG. 3
FIG. 4
INVENTOR.
Franklyn Y. Carter
BY
Andrew K. Fouldo
his ATTORNEY Patented Apr. 29, 1952

2,594,393

UNITED STATES PATENT OFFICE 2,594,393

PRESSURE LIMITING MEANS FOR LIQUID CHARGED REFRIGERATION EXPANSION VALVES

Franklyn Y. Carter, Dearborn, Mich., assignor to Detroit Lubricator Company, Detroit, Mich., a corporation of Michigan Application November 9, 1948, Serial No. 59,134

15 Claims. (Cl. 236—92)

1

This invention relates to new and useful improvement in thermostatic refrigeration expansion valves and more particularly to a pressure limiting means for a "liquid charged" expansion valve. In the art of thermostatic refrigeration expansion valves there are two principal types which are in general use, namely, the "liquid charged" expansion valve and the "gas charged" expansion valve.

The thermostatic "gas charged" refrigeration expansion valve has a bulb element which contains a thermostatic volatile fluid for transmitting pressure to the diaphragm or bellows which operates the valve, the quantity of volatile fluid being such that it may be completely vaporized within the range of normal operating temperatures of the valve and is capable of being condensed completely within the space enclosed immediately above the diaphragm or bellows. This type of valve has the advantage that it is self-limiting as to pressure and temperature of operation since when a maximum predetermined temperature is reached all of the volatile fluid will have entered the gas phase and no further increase in pressure will be obtained by further increase in temperature of the bulb element. The "gas charged" valve, however, has the disadvantage that if the temperature of the valve diaphragm chamber falls below that of the bulb element there is a tendency for the volatile fluid to condense in the valve above the diaphragm thus placing the bulb element out of control of the valve.

The other type of valve mentioned, the "liquid charged" expansion valve, has a quantity of volatile fluid in the bulb element and above the diaphragm in the valve itself such that even when the space above the operating diaphragm of the valve is completely filled with such fluid there will still be some volatile fluid in the bulb element so that the bulb element can never lose control of the valve. This type of valve has the disadvantage that there is no means present to limit the pressure and temperature operation of the valve. Accordingly, it is one object of this invention to provide a new and improved "liquid charged" refrigeration expansion valve.

Another object is to provide an improved pressure limiting means for a "liquid charged" refrigeration expansion valve.

Another object is to provide an improved pressure limiting means for a temperature operated valve.

Another object is to provide a "liquid charged" refrigeration expansion valve having a pressure

2 limiting feature which is simply constructed, easily and inexpensively manufactured, and simple to operate.

Other objects will become apparent from time to time throughout the specification and claims as hereinafter related.

This invention comprises the new and improved construction and combination of parts and their cooperative relationship to each other to be described more fully hereinafter and the novelty of which will be particularly pointed out and distinctly claimed.

Figure 5:
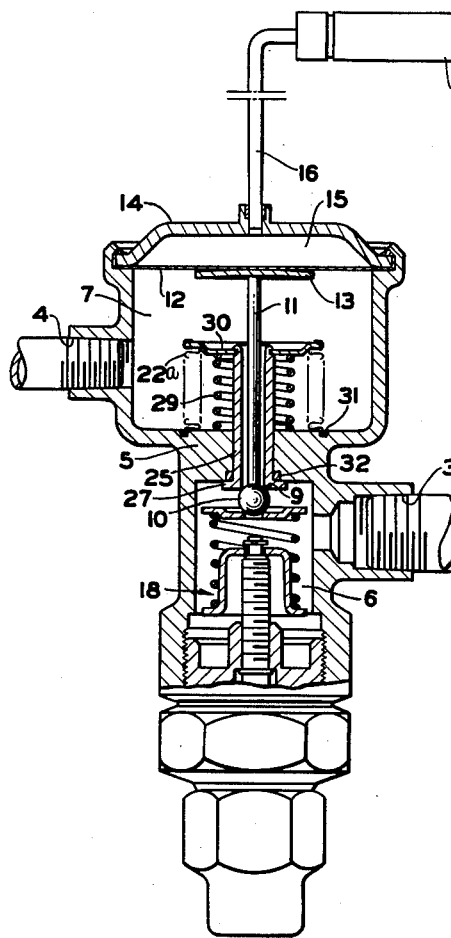
Figure 6:
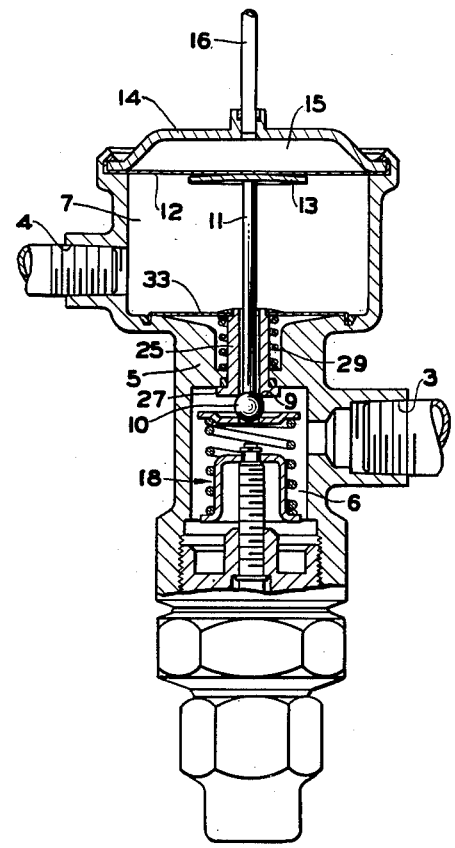

In the accompanying drawings to be taken as part of this specification there are clearly and fully illustrated four preferred embodiments of this invention in which drawings:

Figure 1 is a view partially in section of a refrigeration expansion valve incorporating one form of this invention, Fig. 2 is a view of a refrigeration expansion valve partially in section which has a movable valve seat and a pressure responsive means for actuating said seat to function as a pressure limiting means, Fig. 3 is a fragmentary view of the valve shown in Fig. 2 but showing the valve member in an open position, Fig. 4 is a fragmentary view of the valve shown in Fig. 2 but with the valve member in open position and the pressure limiting means fully actuated, Fig. 5 is a view partially in section of a refrigeration expansion valve similar to that shown in Fig. 2 but showing alternate means for moving the movable valve seat member, and Fig. 6 is a view of the refrigeration expansion valve partially in section similar to that shown in Fig. 5 but showing a slightly different means for actuating the movable valve seat member.

Referring to the drawings by characters of reference, there is shown in Fig. 1 a refrigeration expansion valve which comprises a valve casing 2 having an inlet 3 and an outlet 4. The valve casing 2 has an interior wall 5 which subdivides the casing into an inlet chamber 6 and an outlet chamber 7 and which has an aperture 8 intercommunicating the chambers 6 and 7. The aperture 8 forms a valve seat 9 at one end which cooperates with a valve member 10 for controlling flow of refrigerant through the valve. The valve member 10 has a valve stem 11 which extends through the aperture or passageway 8 into the outlet chamber 7. There is a pressure responsive diaphragm 12 which closes one end of the outlet chamber 7 and which is operable to move the valve stem 11 through a thrust plate 13. There is a cup-shaped cap member 14 which is fitted over the diaphragm 12 and holds the same in position and which encloses a pressure chamber 15. There is a tube or conduit 16 which opens at one end into the pressure chamber 15 and which is connected at its other end to a bulb element 17. The bulb element 17, tube 16, and pressure chamber 15 form a liquid charged power element which contains a volatile fluid for supplying pressure to the diaphragm 12. As was pointed out before, the amount of volatile fluid in a liquid charged power element is such that when the pressure chamber 15 and conduit 16 are completely filled with said fluid there will still remain some fluid in the bulb element 17 so that at no time will the bulb element 17 lose its ability to respond to temperature for actuating the valve. There is a conventional spring or adjustment mechanism 18 which cooperates with the valve member 10 in opposition to the force of the power element and which is operable to determine the force required to open the valve and also determining the superheat setting of the valve. There is a second valve member 19 in the form of a ball of a rubber-like material (rubber-like being intended as a generic term to cover elastic and resilient organic compounds such as rubber, synthetic rubber and other organic elastomers) which has an aperture through the center thereof through which is positioned the valve stem 11. When the valve member 10 is moved to an open position by the temperature response of the bulb element 17 the flow of refrigerant upward through the passageway 8 will cause the ball 19 to be moved upward to permit continued flow of refrigerant. There is a lever member 20 which is pivoted as at 21 and which is operable upon movement to engage and move downward the ball-shaped valve member 19. The lever member 20 is operatively connected to a pressure responsive bellows 22 which is sealed in one wall of the valve casing surrounding the outlet chamber 7. The bellows 22 is responsive to pressure in the outlet chamber 7 and its degree of response is determined by a spring 23 and adjustment screw 24.

In operation this form of the invention functions as follows: The expansion valve 1 would be connected normally in a refrigeration system to control flow of regrigerant to a refrigerant evaporator and the bulb element 17 would normally be connected to the outlet end of the evaporator for temperature response to determine the superheat setting of the valve in accordance with the setting of the spring 18 in the valve. As is well known in refrigeration art, it is desirable to limit the pressure of expansion valve operation at the beginning of operation, that is, during the so-called "pull down" period. When the system is out of service the refrigerant in the system receives heat from the surrounding space and as a result the pressure in the system will increase to a value considerably higher than the desirable operating pressure. When a "gas charged" expansion valve is used in a refrigeration system the power element and bulb is charged to a predetermined maximum operating pressure. If the pressure in the system rises above this maximum operating pressure the pressure in the expansion valve will be greater than the pressure in the power element above the operating diaphragm and the valve will not be able to open until the compressor has "pulled down" this pressure to a value less than that in the power element. This operates to prevent further supply of refrigerant through the valve to the compressor until the pressure on the suction side of the compressor has been decreased to the normal operating range thus preventing overloading the compressor. If a "liquid charged" expansion valve is used in the refrigeration system the pressure in the power element and bulb will be equal to the pressure in the valve between cycles of operation and as soon as the compressor begins to operate the decrease in pressure within the valve will produce a pressure differential across the operating diaphragm and thus cause the valve to open. The opening of the valve at this point frequently results in overloading of the compressor by permitting high pressure refrigerant vapor to enter the suction side of the compressor. In the present valve construction the pressure responsive bellows 22 is set for a predetermined pressure for limiting operation of the valve. If the pressure in the valve increases above the maximum pressure the bellows 22 will be compressed thus rotating the lever 20 downward to compress the rubber ball valve member 19 against the upper end of the passageway 8. Then when the compressor is started, although the initial decrease of pressure will cause the diaphragm 12 to move the valve member 10 to open position the valve member 19 will prevent flow of refrigerant through the valve until the suction pressure is further reduced. When the pressure is reduced below the set maximum operating pressure the bellows 22 will have expanded and rotated the lever 20 upward thus releasing the valve member 19. The upward rotation of the lever 20 is limited by a stop member 20ᵃ. With the lever 20 rotated free from compressing the valve member 19 the flow of refrigerant upward through the passageway 8 will move the valve member 19 away from the upper surface thereof to permit flow through the valve. As is obvious from the foregoing description of operation the bellows 20 will act to close the valve member 19 at any time that the pressure in the valve exceeds the pressure of response of the bellows.

In Fig. 2 there is shown an alternate form of this invention in which figure parts of the same structure are given the same reference numerals as their corresponding parts in Fig. 1.

In this form of the expansion valve the interior wall 5 which subdivides the casing 2 into inlet and outlet chambers has a movable sleeve member 25 which is slidably positioned in an aperture 26. The sleeve member 25 has a flange portion 27 in the inlet chamber side of the dividing wall which provides a valve seat 9. The sleeve member 25 also projects upward into the outlet chamber 7 and has a surrounding flange 28 around its projecting end portion. There is a spring 29 compressed between the wall 5 and the flange 28 and which is operable to hold the flange 27 seated against the bottom portion of the wall 5. The same type of pressure responsive bellows as was used in Fig. 1 is used in this form of the invention and is operatively connected to the lever 20 which engages the flange 28 of the sleeve member 25 and is operable upon movement to move the sleeve 25 downward.

In normal operation this expansion valve is connected to the evaporator of a refrigeration system to control flow of refrigerant thereto and has its responsive bulb element connected to the outlet of the evaporator to determine superheat at that point. In this valve the movable seat sleeve member 25 operates similarly to the valve member 19 of Fig. 1 to limit valve operation. When the pressure within the valve casing is increased the bellows 22 will tend to collapse and attempt to move the lever 20 to move the sleeve member 25 downward. Since at this stage of operation the pressure in the valve casing and in the power element are equal the valve member 10 is held closed by the spring 18 which spring is operable ordinarily to resist movement of the sleeve member 25. When the compressor is started, the pressure in the valve casing will be decreased and a pressure differential created across the diaphragm 12. This pressure differential will cause the diaphragm 12 to move the valve member 10 downward but as long as the pressure in the casing is above the pressure of response of the bellows 22 the bellows will move toward a collapsed position thus causing the sleeve member 25 to follow the valve member 10 so that the valve will not be opened. Upon sufficient "pull down" of pressure the bellows 22 will expand and permit the valve sleeve 25 to move upward thus opening the valve. As was pointed out in the operation of Fig. 1 this mechanism would also function to close off the valve whenever the pressure in the casing became excessive from any cause. From this it is seen that in this form of the invention, as in Fig. 1 there is provided actually two valve means for controlling refrigerant flow. The first valve means, the valve member 10, movable by the liquid charged power element is operable to control flow of refrigerant in response to evaporator temperature. The other valve means, the movable sleeve member, is actuated by pressure responsive bellows 22 and is operable to prevent the flow of refrigerant upon occurrence of pressure in the valve casing above a maximum limiting value.

The form of the invention shown in Fig. 5 is substantially the same as that shown in Fig. 2, 3 and 4 except that the pressure responsive bellows 22ᵃ in connected directly to the movable sleeve member 25 by the bellows end wall or end plate 30. In this form of construction the spring 29 which holds the sleeve member 27 against the underside of the valve wall 5 is engageable directly with the bellows end wall 30 rather than the surrounding flange as in Fig. 2.

In this form of construction the bellows 22ᵃ is sealed in the wall 5 as at 31 and the sleeve member 25 must be sealed against leakage to the interior of the bellows by a packing or washer 32. In this form of valve construction as in that shown in Fig. 2 the bellows 22ᵃ is operable upon occurrence of excessive pressure in the valve outlet chamber 7 to be compressed to move the valve seat 9 downward to continue engagement with the valve member 10 to prevent flow of refrigerant as shown and described in Fig. 4.

In Fig. 6 there is shown a valve which differs in construction from Fig. 5 only in that a pressure responsive diaphragm 33 is connected to the sleeve member 25 instead of the bellows 22ᵃ of Fig. 5. The operation of Fig. 6 is substantially identical to that of Figs. 2 and 5.

From the foregoing description it is seen that there is provided a new and improved means for limiting operation of a "liquid charged" expansion valve upon occurrence of pressure within the valve casing above a predetermined value. It should be noted that while the described pressure limiting means is particularly useful in conjunction with "liquid charged" valves it can be used to equal advantage with any temperature operated valve where the mode of use requires a limit on the pressure of operation. It will be obvious to those skilled in the art that there are other modifications of this invention which are possible without departing from the scope and intent of this disclosure and which is intended to be limited only by the extent of the following claims.

Having thus described the invention, what is claimed and desired to be secured by Letters Patent of the United States is:

1. A "liquid charged" refrigeration expansion valve comprising a valve casing having an inlet chamber and an inlet, and an outlet chamber and an outlet, a passageway interconnecting said said inlet and outlet chambers, a first valve means for controlling flow of refrigerant through said passageway, a pressure responsive diaphragm responsive on one side to pressure on the outlet side of the valve and operatively connected to said valve means for moving the same, a thermostatic "liquid charged" power element for supplying pressure to the other side of said diaphragm to move the same in response to temperature changes, a second valve means for controlling flow of refrigerant through said passageway, and pressure responsive means positioned in said outlet chamber and operatively connected to said second valve means and operable to move the same in response to pressure in said outlet chamber to maintain said passageway closed at pressures in excess of a predetermined value.

2. A "liquid charged" refrigeration expansion valve comprising a valve casing having an inlet chamber and an inlet, and an outlet chamber and an oulet; a passageway interconnecting said inlet and outlet chambers, a first valve member cooperable with one end of said passageway to control flow of refrigerant, a pressure responsive diaphragm responsive on one side to pressure on the outlet side of the valve and for moving said valve member, a valve stem extending through said passageway and interconnecting said diaphragm and said valve member, a thermostatic "liquid charged" power element for supplying pressure to the other side of said diaphragm to move the same in response to temperature changes, a second valve member surrounding said valve stem and movable relative thereto and operable to control flow of refrigerant through said passageway, and pressure responsive means responsive to pressure in said outlet chamber and operatively connected to said second valve member, said last-named pressure responsive means being operable upon occurrence of a predetermined pressure in said outlet chamber to move the said second valve member relative to said passageway to maintain said passageway closed independently of movement of said first valve member.

3. A "liquid charged" refrigeration expansion valve comprising a valve casing having an inlet chamber and an inlet, and an outlet chamber and an outlet; a passageway interconnecting said inlet and outlet chambers, a first valve member cooperable with one end of said passageway to control flow of refrigerant, a pressure responsive diaphragm responsive on one side to pressure on the outlet side of the valve and for moving said valve member, a valve stem extending through said passageway and interconnecting said diaphragm and said valve member, a thermostatic "liquid charged" power element for supplying pressure to the other side of said diaphragm to move the same in response to temperature changes, a second valve member surrounding said valve stem and movable relative thereto and operable to control flow of refrigerant through said passageway, said second valve member comprising a ball of a rubberlike material having a central aperture and slidably positioned on said valve stem at the other end of said passageway, said ball being operable to be lifted by flow of refrigerant when said first valve member is opened, a lever member cooperable with said ball and operable to move the same, a pressure responsive bellows member positioned for response to pressure in said outlet chamber and connected to said lever member and operable to move the same, and said bellows member being operable upon increase of pressure in said outlet chamber to move said lever member to compress said ball against said passageway other end to close off flow therethrough.

4. A "liquid charged" refrigeration expansion valve comprising a valve casing having an inlet chamber and an inlet, and an outlet chamber and an outlet; a passageway interconnecting said inlet and outlet chambers, a movable sleeve member positioned in said passageway and forming a valve seat, a valve member movable toward and away from said valve seat to control flow of refrigerant, a pressure responsive diaphragm responsive on one side to pressure on the outlet side of the valve and operatively connected to said valve member for moving the same, a thermostatic "liquid charged" power element for supplying pressure to the other side of said diaphragm to move the same in response for temperature changes, said diaphragm being operable upon occurrence of a predetermined pressure differential thereacross to move said valve member away from said valve seat thereby opening said valve, the extent of valve opening varying with the power element temperature and said outlet side pressure, pressure responsive means positioned for response to pressure in said outlet chamber and operatively connected to said sleeve member and operable to move the same, and said pressure responsive means being operable upon predetermined increase in pressure in said outlet chamber to move said sleeve member to maintain said valve seat engaged with said valve member independently of movement of said valve member.

5. A "liquid charged" refrigeration expansion valve comprising a valve casing having an inlet and an outlet, said casing having an internal wall subdividing it into an inlet chamber and an outlet chamber with an aperture intercommunicating said chambers, a movable sleeve member positioned in said aperture and having a surrounding flange at one end seating against said wall on the inlet chamber side and forming a valve seat, said sleeve member projecting into said outlet chamber and having a second surrounding flange at the other end, a spring positioned between said wall and said second flange to hold said first-named flange against said wall, a valve member in said inlet chamber movable toward and away from said valve seat to control flow of refrigerant and having a valve stem extending through said sleeve member into said outlet chamber, a pressure responsive diaphragm positioned across said outlet chamber and connected to said valve stem for moving the same, a "liquid charged" power element for supplying pressure to the outer side of said diaphragm to move the same in response to temperature changes, said valve member being moved away from said valve seat by said diaphragm upon occurrence of a predetermined pressure differential thereacross, the extent of valve opening being determined by power element temperature and pressure in said outlet chamber, means in said outlet chamber responsive to pressure therein and operable upon occurrence of a predetermined pressure to move said sleeve member to maintain said valve seat engaged with said valve member independently of movement of said valve member.

6. A "liquid charged" refrigeration expansion valve comprising a valve casing having an inlet and an outlet, said casing having an internal wall subdividing it into an inlet chamber and an outlet chamber with an aperture intercommunicating said chambers, a movable sleeve member positioned in said aperture and having a surrounding flange at one end seating against said wall on the inlet chamber side and forming a valve seat, said sleeve member projecting into said outlet chamber and having a second surrounding flange at the other end, a spring positioned between said wall and said second flange to hold said first-named flange against said wall, a valve member in said inlet chamber movable toward and away from said valve seat to control flow of refrigerant and having a valve stem extending through said sleeve member into said outlet chamber, a pressure responsive diaphragm positioned across said outlet chamber and connected to said valve stem for moving the same, a "liquid charged" power element for supplying pressure to the outer side of said diaphragm to move the same in response to temperature changes, said valve member being moved away from said valve seat by said diaphragm upon occurrence of a predetermined pressure differential thereacross, the extent of valve opening being determined by power element temperture and the pressure in said outlet chamber, a lever member in said outlet chamber operable upon movement to engage said second flange to move said sleeve member, a bellows responsive to pressure in said outlet chamber and operatively connected to said lever for moving the same, and said sleeve member being operable upon occurrence of a predetermined pressure in said outlet chamber to be moved to engage said valve seat with said valve member independently of movement of said valve member.

7. A "liquid charged" refrigeration expansion valve comprising a valve casing having an inlet and an outlet, said casing having an internal wall subdividing it into an inlet chamber and an outlet chamber with an aperture intercommunicating said chambers, a movable sleeve member positioned in said aperture and having a surrounding flange at one end seating against said wall on the inlet chamber side and forming a valve seat, said sleeve member projecting into said outlet chamber, a valve member in said inlet chamber movable toward and away from said valve seat to control flow of refrigerant and having a valve stem extending through said sleeve member into said outlet chamber, a pressure responsive diaphragm positioned across said outlet chamber and connected to said valve stem for moving the same, a "liquid charged" power element for supplying pressure to the outer side of said diaphragm to move the same in response to temperature changes, said valve member being moved away from said valve seat by said diaphragm upon occurrence of a predetermined pressure differential thereacross, the extent of valve opening being determined by power element temperature and the pressure in said outlet chamber, a pressure responsive member in said outlet chamber secured to said wall around said sleeve member and having an end wall with an aperture secured to the projecting end of said sleeve member, a spring positioned between said internal wall and said bellows end wall and operable to hold said flange against said internal wall, and said pressure responsive member being operable upon predetermined increase of pressure in said outlet chamber to move said sleeve member to maintain said valve seat engaged with said valve member independently of movement of said valve member.

8. A temperature operated valve comprising a valve casing having an inlet and an outlet and an interconnecting passageway, a first valve member cooperable with one end of said passageway to control flow of refrigerant, thermostatic means for moving said valve member, a valve stem extending through said passageway and interconnecting said thermostatic means and said valve member, a second valve member surrounding said valve stem and movable relative thereto and operable to control flow of refrigerant through said passageway, said second valve member comprising a ball of a rubber-like material having a central aperture and slidably positioned on said valve stem at the other end of said passageway, said ball being operable to be lifted by flow of refrigerant when said first valve member is opened, a lever member cooperable with said ball and operable to move the same, a pressure responsive bellows member connected to said lever member and operable to move the same, and said bellows member being operable upon increase of pressure in said casing to move said lever member to compress said ball against said passageway other end to close off flow therethrough.

9. A temperature operated valve comprising a valve casing having an inlet and an outlet, said casing having an internal wall subdividing it into an inlet chamber and an outlet chamber with an aperture intercommunicating said chambers, a movable sleeve member positioned in said aperture and having a surrounding flange at one end seating against said wall on the inlet chamber side and forming a valve seat, said sleeve member projecting into said outlet chamber and having a second surrounding flange at the other end, a spring positioned between said wall and said second flange to hold said first-named flange against said wall, a valve member in said inlet chamber movable toward and away from said valve seat to control flow of refrigerant and having a valve stem extending through said sleeve member into said outlet chamber, thermostatic means connected to said valve stem for moving the same, said valve member being moved away from said valve seat by said thermostatic means upon increase in temperature of the same, a lever member in said outlet chamber operable upon movement to engage said second flange to move said sleeve member, a bellows responsive to pressure in said outlet chamber and operatively connected to said lever for moving the same, and said sleeve member being operable upon movement to engage said valve seat with said valve member independently of movement of said valve member.

10. A liquid charged refrigeration expansion valve, comprising a valve casing having an inlet chamber and an inlet, and an outlet chamber and an outlet; means including a passageway interconnecting said inlet and outlet chambers, a first means including a movable valve member operable to open and to close said passageway to control flow of refrigerant through said valve, a pressure responsive diaphragm responsive on one side to pressure on the outlet side of the valve and operatively connected to said valve member for moving the same, a thermostatic "liquid charged" power element for supplying pressure to the other side of said diaphragm to move the same in response to temperature changes, a second means to control the opening and closing of said passageway to control flow of refrigerant therethrough independently of movement of said valve member, and means responsive to pressure in said outlet chamber and operable upon occurrence of a predetermined pressure therein to actuate said second flow controlling means to maintain said passageway closed independently of valve member movement.

11. A liquid charged refrigeration expansion valve, comprising a valve casing having an inlet chamber and an inlet, and an outlet chamber and an outlet; means including a passageway interconnecting said inlet and outlet chambers, a first means including a movable valve member operable to open and to close said passageway to control flow of refrigerant through said valve, a pressure responsive diaphragm responsive on one side to pressure on the outlet side of the valve and operatively connected to said valve member for moving the same, a thermostatic "liquid charged" power element for supplying pressure to the other side of said diaphragm to move the same in response to temperature changes, a second means including a movable valve member operable to control the opening and closing of said passageway to control flow of refrigerant therethrough independently of movement of said first-named valve member, and means responsive to pressure in said outlet chamber and operable upon occurrence of a predetermined pressure therein to actuate said second valve member to maintain said passageway closed independently of movement of said first-named valve member.

12. A refrigeration expansion valve as defined in claim 1 including spring means cooperable with said pressure responsive means and adjustment means therefor to determine the pressure of response.

13. A refrigeration expansion valve as defined in claim 4 including spring means cooperable with said pressure responsive means and adjustment means therefor to determine the pressure of response.

14. A refrigeration expansion valve as defined in claim 10 including spring means cooperable with said pressure responsive means and adjustment means therefor to determine the pressure of response.

15. In a valve of the character described, a valve casing having a passageway therethrough, a valve seat member providing a valve port in said passageway and bodily movable in said casing, stop means for said valve seat member, a valve member movable in said passageway relative to said valve seat member to open and close said valve port, a first temperature or pressure responsive means operatively connected to said valve member to move the same relative to said valve seat member to open or to close said valve port, spring means urging said valve seat member against said stop means, said valve seat member being movable away from said stop means in the direction of valve opening movement of said valve member, and a second temperature or pressure responsive means operatively connected to said valve seat member and operable upon occurrence of a predetermined condition of response to move said valve seat member against the force of said spring means and along with said valve member to prevent the valve from opening.

FRANKLYN Y. CARTER.

REFERENCES CITED

The following references are of record in the file of this patent:

UNITED STATES PATENTS

| Number | Name | Date |
|---|---|---|
| 1,829,402 | Keighley | Oct. 27, 1931 |
| 1,941,023 | Smith | Dec. 26, 1933 |
| 2,021,727 | Hillen et al. | Nov. 19, 1935 |
| 2,113,351 | Lear | Apr. 5, 1938 |
| 2,219,542 | Clifford | Oct. 29, 1940 |
| 2,335,824 | Dillman | Nov. 30, 1943 |
| 2,420,206 | Smith | May 6, 1947 |
| 2,463,951 | Carter | Mar. 8, 1949 |